Aug. 23, 1938.   A. HOERBIGER   2,127,688

ANNULAR AUTOMATIC VALVE

Filed Jan. 30, 1936

INVENTOR
Alfred Hoerbiger
By Eugene E. Stevens

Patented Aug. 23, 1938

2,127,688

UNITED STATES PATENT OFFICE 2,127,688

ANNULAR AUTOMATIC VALVE

Alfred Hoerbiger, Mauer, near Vienna, Austria

Application January 30, 1936, Serial No. 61,608
In Austria June 1, 1935

3 Claims. (Cl. 251—119)

In an automatic valve, the movable closing member of which is in the form of an annular disc or plate, it is known to control the valve plate by a member composed of a portion of the valve plate and a spring plate in the form of a flat spiral spring the latter being anchored by its central hub portion to the valve guard. In such a construction it is the usual custom for the tension member to be capable of lying in one plane when the valve is open.

A disadvantage of this arrangement consists in the fact that although the valve plate may be controlled accurately when in an open position it is less accurately controlled when in the closed position. In the open position the tension member lies in the same plane as the plate and can be arranged to fill or fit closely within an opening in the plate and thus offer maximum resistance to a lateral displacement of the plate. In the closed position, on the other hand, the guide or tension member is bent or drawn spirally out of the plane of the plate and thus does not afford the same lateral support as when the plate is in the open position. In the operative or closed position, however, it is desirable that the control of the plate shall be as effective as possible in order to maintain a constant good closure in continuous working.

The present invention has for its object to provide a valve of the type referred to in which the above-mentioned disadvantage will be overcome.

According to the invention a central opening is formed in the valve plate. The edge of said opening has formed thereon two or more circumferentially extending arms or portions the free ends of which are connected to the respective inner ends of a corresponding number of spring plates which are arranged between the valve plate and the seating and which constitute a two- or multi-armed control member after the manner of a double- or multi-threaded screw. By this construction the valve plate is accurately controlled positionally when in the closed position. The valve can be provided with a greater number of links or arms.

The accompanying drawing shows one embodiment of the invention, according to which the valve is provided with two arms.

Figure 1:
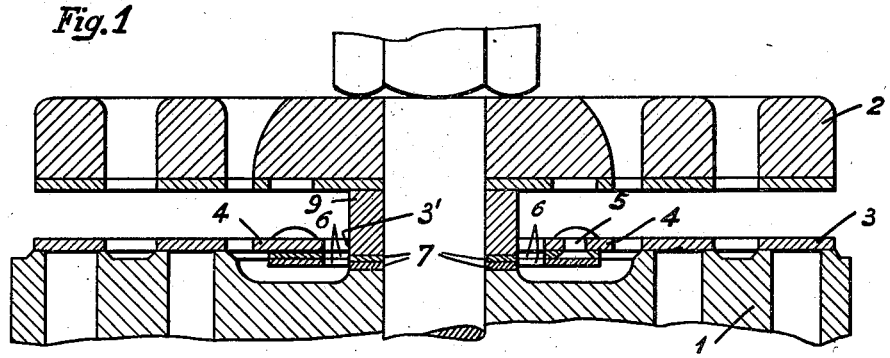
Figure 1 is a vertical section through the central part of the valve which is shown in closed position, the valve seat being partly broken away.

Referring to the drawing, 1 is the valve seating and 2 the stop or guard. The valve plate is shown at 3 and its central opening 3' is provided, in the instance shown, with two circumferentially extending arms 4, 4. The free end of each arm 4 is rigidly attached at 5 in any suitable manner as by riveting, welding or the like, to the end of an arm 6 of a supporting plate 7. The hub portions of the plates 7 are disposed one above the other and are anchored to the valve seating by a collar 9.

Figure 3:
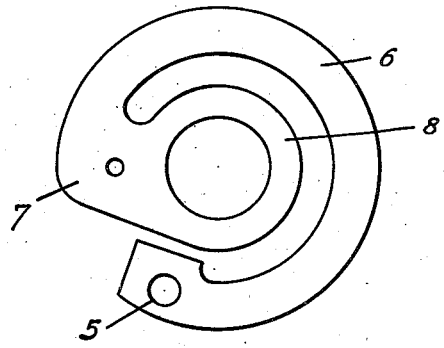
Figure 3 is a plan view of one of the control elements of the valve.

This construction allows each of the arms 6 to extend in an arc of 180° or more. In the illustrated example the extent is about 270°, as may best be seen from Fig. 3. If to this length be added that of the arm 4, which can itself extend through an arc of nearly 180°, there results a total length for each supporting member of more than 360°.

Each control member constitutes, therefore, in an unbent or relaxed state, and even when the connection point 5 of the two parts 4 and 6 is disregarded, a three-dimensional construction of approximately spiral inclination.

Figure 2:
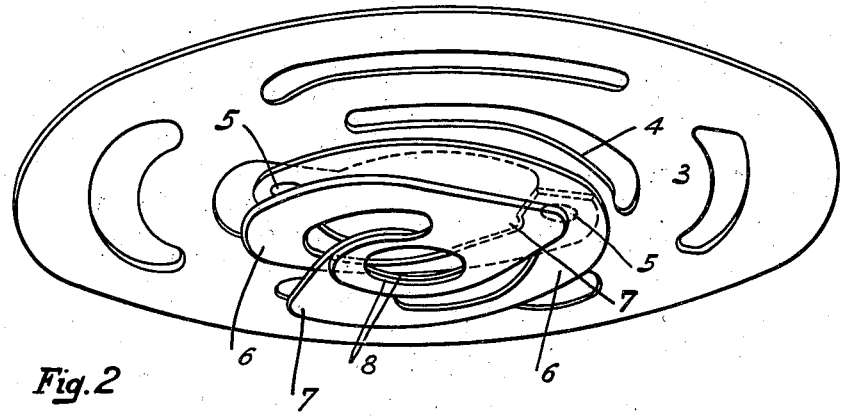
Figure 2 is a perspective view of the valve plate and control elements.

The two control members do not interfere with one another if, as will best be seen from Fig. 2, they are interlaced after the manner of a double-threaded screw.

In order to recognize more clearly the course of the control members, in Figure 2, only the portion 8 which lies undermost is depicted fully.

As previously mentioned three or more control members can be provided instead of two, that is to say the valve plate may have three or more arms such as 4 each connected to the arm 6 of a plate 7.

The construction described presents, in addition to the advantage of the most accurate control of the valve plate in the closed position the further advantage of a considerable permissible lift of the valve plate with relatively limited space requirement for the control members or on the other hand for a determined height of lift a smaller diameter for the control elements. In addition, the guard side of the valve plate is left free for the fitting of damper plates or any other damping devices. The valve construction functions very well since the points of connection of the control arms 4 can swing out freely during the opening movement and do not contact with any fixed part.

I claim:—

1. A device of the class described, comprising a substantially annular valve plate, control means for said valve, said control means comprising at least two concentric control arms formed on the inner circumference of said plate inwardly of the edge thereof, and concentric and substantially helical control members carried by the ends of said arms, said control members being intertwined in the manner of the threads of a multi-threaded screw, and each of said control means extending through an arc of at least 450°.

2. A device of the class described comprising a substantially annular valve plate, control means for said valve and carried thereby, said control means comprising at least two concentric and substantially helical members carried by the inner periphery of said valve and each of said members extending through an arc of more than 360°.

3. A device of the class described comprising a substantially annular valve plate, control means for said valve, said control means comprising at least two concentric control arms formed on the inner circumference of said plate inwardly of the edge thereof, and concentric and substantially helical control members carried by the ends of said arms, said control members being intertwined in the manner of the threads of a multi-threaded screw, and each of said control means extending through an arc of more than 360°.

ALFRED HOERBIGER.